No. 763,003.

Patented June 21, 1904.

UNITED STATES PATENT OFFICE.

RUDOLF KOBERT, OF ROSTOCK, GERMANY, ASSIGNOR TO FIRM OF E. MERCK, OF DARMSTADT, GERMANY.

SAPONIN AND PROCESS OF MAKING SAME.

SPECIFICATION forming part of Letters Patent No. 763,003, dated June 21, 1904.

Application filed February 1, 1904. Serial No. 191,639. (Specimens.)

*To all whom it may concern:*

Be it known that I, RUDOLF KOBERT, a subject of the Emperor of Germany, residing at Rostock, Germany, have invented certain new and useful Saponins and Processes of Producing the Same, of which the following is a clear, full, and exact description.

My invention relates to a new class of saponins, as well as a particular saponin contained in said class, and also to a process for producing any one of the same.

My invention will be set forth in the claims.

All of the heretofore-produced saponins, so far as I am aware, have been held to be poisonous and to exert a particularly pernicious effect on the blood by causing the corpuscles of the latter to dissolve. I, however, have succeeded in isolating from *Bulnesia sarmienti*, as well as from *Guaiacum officinale*, two saponins which differ from all other saponins heretofore known by reason of their being non-poisonous. One of these two glucosides has a neutral reaction, the other one a weakly-acid reaction.

My process, as preferably carried out, is as follows: The bark, roots, &c., of *Guaiacum officinale* or *Bulnesia sarmienti*, are first reduced to a coarse powder and then repeatedly exhausted with benzol until the latter acquires no more color and leaves no resin on evaporation. This removes the coloring-matter and resin, but leaves both saponins behind undissolved in the residue. The powder is then dried again thoroughly, and in order to remove the saponins therefrom it may be exhausted by boiling vigorously with six successive portions of at least ten times its quantity of water over an open fire. The aqueous decoction, which, unlike other bark decoctions, is not acid, but is weakly alkaline, is strained while hot and filtered, (the filtrate containing both saponins,) and this filtrate is then accurately neutralized, preferably with acetic acid. From this filtrate the acid glucoside may be quantitatively precipitated, preferably as a basic lead salt, by adding neutral lead acetate in excess, the neutral glucoside remaining in solution. The precipitated lead salt may be collected on a filter and washed with lead-acetate solution until the washings no longer give a precipitate with lead-subacetate solution and yield no residual organic matter on removing the lead. This step, however, is not essential to my process and might be omitted; but it increases the yield. The lead salt may then be suspended in distilled water and decomposed, preferably with hydrogen sulfid. By this treatment the acid glucoside is liberated and is found partly with the lead-sulfid precipitate and partly in solution in the water. The mixture is filtered and the filtrate evaporated, preferably in a vacuum, the residue (unpurified saponinic acid) dissolved with the aid of heat in anhydrous alcohol, and the solution after filtering precipitated by adding ether. In order to remove the saponinic acid from the above-specified lead-sulfid precipitate, this precipitate is similarly dried, reduced to powder, and exhausted, preferably with the strongest possible alcohol. This solution is also precipitated with ether, filtered, and the precipitate washed with ether and dried over calcium chlorid. The product is the same saponinic acid as before. This (pure) acid glucoside is a loose, almost white, powder, guaiac saponinic acid.

In order to remove the neutral glucoside, the filtrate from the above-mentioned lead-acetate precipitate is treated, preferably with lead-subacetate solution in excess, whereby the neutral glucoside is quantitatively precipitated. The precipitate is then collected, and, if desired, may be washed with lead-subacetate solution in order to remove any acid saponin which may be present; but it will be obvious that this step might be omitted, if desired. The precipitate may be then suspended in distilled water and decomposed, preferably by treatment with hydrogen sulfid. The isolation of the pure neutral saponin from the lead-sulfid precipitate and also from the remaining filtrate may then be effected axactly as heretofore specified in the case of the acid saponin.

It will be observed that in each of the procedures above set forth the particular saponin is removed from the extract in the form of a lead salt—in the case of the acid-glucoside by precipitating the salt directly from the extract, and in the case of the neutral glucoside by precipitating it from the filtrate resulting from the first step. In each case the respective lead salt is then decomposed and the pure saponin precipitated from its alcoholic solution and when dried is in the form of a powder.

The neutral saponin is harmless, and the acid saponin substantially so, whether ingested per os or injected into the blood. When added to some blood contained in a test-tube, the acid saponin dissolved blood corpuscles to a small extent. The neutral saponin, however, dissolved none at all. Each compound, no matter how ingested into the system, is voided unchanged in the urine, whereas the contrary is the case with most other saponins. When injected under the skin, neither of the saponins causes any pus formation, whereas other saponins do.

I do not yet know definitely what the chemical structure of these saponins is; but regarding their characteristics the following may be stated: First, each of them yields with Mandelin's reagent (a solution of one gram ammonium vanadate in two hundred grams concentrated sulfuric acid) a violet, then rose-red color. Second, Mecke's reagent (a solution of selenous acid in concentrated sulfuric acid, one to two hundred) affords a handsome violet. Of course this test should always be employed without the presence of water. Third, on heating either saponin with Millon's reagent (a solution of mercury in an equal volume of fuming nitric acid, this solution being then diluted with two volumes of water) an intense red color develops. Fourth, the following substances precipitate each saponin from its aqueous solution: potassium-bismuth iodid, potassium-cadmium iodid, phosphotungstic acid, phosphomolybdic acid, iodo-potassium iodid, saturated solution of sulfate of ammonium. Both glucosides are easily and completely precipitated by a saturated solution of ammonium sulfate from their alcoholic or aqueous solutions, whether these are neutral, alkaline, or acid, which is not the case with quillaja saponin. This precipitability by ammonium sulfate, therefore, constitutes a very important difference between my glucosides and quillaja saponin.

The aqueous solutions of the two saponins differ in that the saponinic acid (contrary to what is the case with quillajic acid) may be precipitated by sulfuric and acetic acids, (in the cold,) whereas the neutral saponin remains in solution. The solubility of the neutral saponin in water is high, (one to five.) That of the acid saponin, however, is very slight, but may, nevertheless, be increased up to one to ten by neutralizing with an alkali. Both are easily soluble in alcohol, but insoluble in ether. Shaking out can be effected neither with ether nor chloroform, but may be partially accomplished with warm isobutyl and amyl alcohols. Both possess slight reducing properties even when perfectly free from sugar—e. g., on Brouardel-Boutmy's reagent and on gold-chlorid solution. On boiling either saponin with hydrochloric or sulfuric acid the saponin is split into (*a*) a sapogenin insoluble in water and (*b*) a sugar which is fermentable, yields an osazone, and reduces Fehling's solution.

It will be observed that both of these saponins may be produced from either of the guaiac plants mentioned—that is, either from *Guaiacum officinale* or *Bulnesia sarmienti;* but I do not limit myself to the production from these two plants alone, nor do I limit myself to the production of both saponins, as it may be desirable in some cases to produce only one of them.

It will be obvious that some of the steps heretofore mentioned may be omitted without departing from the scope of my invention as claimed, and I therefore do not limit myself to the employment of all the steps heretofore set forth.

What I claim is—

1. A saponin in the form of a powder which is soluble in alcohol but not in ether, which may be precipitated from its aqueous or alcoholic solution by a saturated solution of ammonium sulfate, and which yields a violet, then rose-red color with Mandelin's reagent, violet with Mecke's reagent, and red on heating with Millon's reagent.

2. A neutral saponin in the form of a powder which is easily soluble in alcohol and in water but not in ether, which may be precipitated from its aqueous or alcoholic solution by a saturated solution of ammonium sulfate, and which yields a violet, then rose-red color with Mandelin's reagent, violet with Mecke's reagent, and red on heating with Millon's reagent.

3. The process of producing a saponin which consists in treating a guaiac extract with a suitable reagent which precipitates the saponin in the form of a salt, decomposing said salt, and isolating the saponin therefrom by precipitating the same from a solution of a product of such decomposition.

4. The process of producing a neutral saponin, which consists in treating a saponin-containing guaiac extract with a suitable reagent which precipitates an acid saponin in the form of a salt, treating the resulting filtrate with a suitable reagent which precipitates the neutral saponin in the form of a salt, and decomposing said salt.

5. The process of producing a neutral saponin, which consists in treating a saponin-containing guaiac extract with a suitable reagent which precipitates an acid saponin in the form of a salt, treating the resulting filtrate with a suitable reagent which precipitates the neutral saponin in the form of a salt, and isolating the pure neutral saponin therefrom.

6. A step in the process of producing a saponin, which consists in treating a saponin-containing guaiac extract with a suitable reagent which precipitates one of the contained saponins in the form of a salt, leaving the other saponin in solution in the filtrate.

7. The process of producing a saponin, which consists in treating a saponin-containing guaiac extract with lead acetate, thereby precipitating one of the contained saponins in the form of a lead salt, and isolating the saponin from one of the constituents of the resulting mixture.

8. The process of producing a neutral saponin, which consists in treating a guaiac extract which contains a neutral and an acid saponin with lead acetate so as to precipitate said acid saponin in the form of a lead salt, precipitating the neutral saponin in the form of a lead salt by treating the resulting filtrate with lead subacetate, decomposing said latter salt by treatment with hydrogen sulfid, and isolating the pure neutral saponin therefrom.

Signed at Berlin this 4th day of January, 1904.

RUDOLF KOBERT.

Witnesses:
HENRY HASPER,
WOLDEMAR HAUPT.